United States Patent [19]
Itoh

[11] Patent Number: 5,264,769
[45] Date of Patent: Nov. 23, 1993

[54] RECORDING DEVICE WITH A CONTROLLABLE CARRIAGE DRIVING MOTOR

[75] Inventor: Noriaki Itoh, Yokohama, Japan

[73] Assignee: Canon Kabushiki Kaisha, Tokyo, Japan

[21] Appl. No.: 718,211

[22] Filed: Jun. 20, 1991

[30] Foreign Application Priority Data

Jun. 27, 1990 [JP] Japan .................................. 2-171112

[51] Int. Cl.$^5$ .............................................. G05B 19/40
[52] U.S. Cl. ..................................... 318/685; 318/696
[58] Field of Search ........................................ 318/685

[56] References Cited

U.S. PATENT DOCUMENTS

| 4,928,050 | 5/1990 | Torisawa et al. ............... 318/685 |
| 4,963,808 | 5/1990 | Torisawa et al. . | |
| 5,029,264 | 7/1991 | Ito et al. ........................ 318/685 |

FOREIGN PATENT DOCUMENTS 62-193548 8/1987 Japan .
62-193549 8/1987 Japan .

*Primary Examiner*—William M. Shoop, Jr.
*Assistant Examiner*—Karen Masih
*Attorney, Agent, or Firm*—Fitzpatrick, Cella, Harper & Scinto

[57] ABSTRACT

A recording device performs recording by reciprocating a carriage mounting a recording head by a stepping motor. The recording head includes a rotation position detector for detecting a rotation position of a rotor of the stepping motor, a controller for performing closed-loop driving of a switching timing of an exciting current of the stepping motor according to a detection signal from the rotation position detector, and a motor speed control circuit for controlling a rotation speed of the stepping motor according to the detection signal from the rotation position detector. The device performs stationary confirmation whether the switching timing of the stepping motor is normally performed via the controller.

8 Claims, 8 Drawing Sheets

- 11 ROTOR SHAFT
- 10 ROTOR
- 6 CARRIAGE DRIVING MOTOR
- 13A COIL
- 12A STATOR
- 12B
- 13B
- 15 PHOTO-INTERRUPTER
- 14 DETECTION DISK

- 11 ROTOR SHAFT
- 10 ROTOR
- 13A
- 12A
- 12B
- 13B
- 15 PHOTO-INTERRUPTER
- 14 DETECTION DISK
- 16 ROTARY ENCODER

RECORDING DEVICE WITH A CONTROLLABLE CARRIAGE DRIVING MOTOR

BACKGROUND OF THE INVENTION

1. Field of the Invention

This invention relates to a recording device, and more particularly, to a recording device which uses a stepping motor as a driving source for moving a carriage mounting a recording head.

2. Description of the Prior Art

In a conventional serial-type recording device, a hybrid-type or PM (permanent magnet)-type stepping motor or brushless motor has been normally used as the motor for driving a carriage which carries a recording head for the purpose of recording scanning.

In a brushless motor, for example, Hall elements have been used for detecting positions of magnetic poles of a rotor to perform electric control, and an optical or magnetic encoder has been used for detecting the speed of the rotor.

However, such a conventional brushless motor has the following disadvanges: (1) It is required that magnetic poles of a stator are correctly positioned with respect to the Hall elements; and (2) Since the positions of the Hall elements and the stator are uniquely determined when the current switching is effected by the Hall elements, a method for supplying current to the motor is limited to only one direction. For example, in the case of a so-called 180° electric control, the positions of the Hall elements relative to the magnetic poles of the stator differ by 45° electrically from those in the case of a so-called 90° electric control. If two kinds of electric controls are effected by a single motor, the number of the Hall elements will be doubled and all of the Hall elements must be arranged in positions suitable for performing the respective electric controls.

Incidentally, Japanese Patent Laid-Open Nos. 62-193548 (1987) and 62-193549 (1987) each disclose a stepping motor wherein electric control is effected by utilizing an encoder output. However, these documents merely disclose the structure of the stepping motor itself including the encoder in a predetermined position, but do not disclose or teach the control circuit or method for driving the stepping motor.

U.S. Pat. No. 4,963,808 discloses a control apparatus for a stepping motor including an encoder having portions to be detected, the number of which is an integer multiple of the number of magnetic poles of the rotor, which is fixedly mounted on a shaft of the rotor. When the rotor is rotated, the number of the portions to be detected on the encoder passing by a predetermined position situated at the stator side are counted so that when the counted number coincides with a predetermined value the current supply to the coils of the stator is switched. Conventionally, the drive control for the stepping motor has been performed by merely performing an open-loop control of the number of driving pulses of the stepping motor and the frequency of the pulses.

However, if the stepping motor is used as the carriage driving motor and the stepping motor is driven by the open-loop control, during the movement of the carriage, discordant noise is generated due to the vibration of the rotor of the stepping motor, particularly in the case of the hybrid stepping motor. Further, upon starting, stopping and reversing the carriage, and accordingly, upon start, stop and reverse of the stepping motor, since the stepping motor is started or stopped with vibration, large noise is also generated. These noises must be avoided, particularly in an ink jet printer such as a bubble jet printer which generates no substantial noise.

U.S. Pat. No. 4,928,050 discloses a recording apparatus using the stepping motor as a driving source for scanning a recording head in a recording operation. The apparatus includes detection means for detecting the rotation angle of the rotor of the stepping motor, and control means for performing a closed-loop control of the drive of the stepping motor in accordance with the detection result by the detection means.

However, in order to perform a closed-loop control of the stepping motor, it is necessary to provide an encoder for detecting the rotation angle of the rotor and it is also necessary to register the positions of the magnetic poles of the rotor with the positions of the magnetic poles (slits in the magnetic or optical system) of the encoder during assembly of the stepping motor. The reason why such registration of positions between the magnetic poles of the rotor and those of the encoder is required is that the the phase switching of the stepping motor must be synchronous with the output pulses of the encoder. If such positional registration is not obtained with high accuracy, the motor will not rotate or will rotate at different rotational speeds in opposite directions.

On the other hand, if the number of pulses generated during one revolution of the encoder is increased to improve the resolving power for each pulse, such positional registration will not be required. For example, in a PM stepping motor in which one revolution is achieved by 48 steps, the number of the magnetic poles of the rotor is 24 (twenty-four). In this case, if the number of the output pulses of the encoder is 288 for each revolution, an output having 12 (twelve) pulses can be obtained for each magnetic pole of the rotor. If the encoder is fixedly mounted on the shaft of the rotor at random, since the deviation between the center of the magnetic poles of the rotor and the center of the magnetic poles of the encoder corresponds to a half of a distance of two adjacent pulses at the most, such deviation will be included in the range of ±4.2%. In this case, the deviation in the switching timing of the exciting current will be negligible.

However, in this case, it must be determined which magnetic pole of the encoder corresponds to the particular magnetic pole of the rotor. To this end, first of all, the current is supplied to the coils of the motor for at least a predetermined time period. Then, when the rotor of the motor is slightly rotated by the energization of the coils due to such current supply and then is stopped, the magnetic pole in the encoder which is registered with the magnetic pole of the rotor is selected. The other magnetic poles in the encoder may be selected at intervals of twelve pulses on the basis of the first selected magnetic pole.

The initialization of the encoder as mentioned above must be effected prior to the action of the stepping motor. That is to say, when such stepping motor is used as the carriage driving motor for a serial printer, it is necessary to initialize the encoder before the printer is powered on.

In order to perform such initialization, it has been previously proposed, in U.S. Ser. No. 413,473 filed on Sep. 27, 1989, (now U.S. Pat. No. 5,029,264 issued Jul. 2, 1991), in a recording apparatus to use a stepping motor as a driving source for scanning a recording head in a recording operation, a control device for the stepping motor which comprises detection means for detecting the rotation angle of the rotor of the stepping motor, and control means for performing a closed-loop control of the drive of the stepping motor in accordance with the detection result of the detection means and for driving the stepping motor and holding the rotor by controlling the current according to pulse-width modulation at the initialization processing wherein the drive of the stepping motor by the closed-loop control is started.

In such a device, since it is uncertain where the carriage is situated when power is supplied, the carriage is first moved within a range wherein the initialization can be securely executed.

At this time period, the stepping motor cannot perform closed-loop driving, but can move the carriage with step driving (open-loop driving). Subsequently, the above-described initialization is performed to make possible closed-loop driving. Since the positional relationship for switching the exciting current is thereafter maintained, the rotation of the motor can be continued by counting encoder signals.

However, in a serial-type recording device, since the operation of reversing the carriage is frequently performed in accordance with the printing operation, an abrupt change occurs in an encoder signal. A phenomenon thereby occurs wherein the position for switching the current deviates from a position set at the above-described initialization. As a result, according to a direction of rotation, an excessive current flows, the rotation speed is reduced, and rotation having vibration occurs, deteriorating the quality of printing. In the worst case, the motor stops.

It has also been proposed, in U.S. Ser. No. 551,796 filed on Jul. 12, 1990, (now U.S. Pat. No. 5,097,189 issued Mar. 17, 1992), to provide a recording device for driving a carriage by a stepping motor subjected to closed-loop control, which shifts the phase for switching the exciting current by detecting a change in the speed of the motor, to change the output torque characteristics of the motor, since, when the load torque applied to the carriage motor is increased due to a change in environment or a change in the course of time, the intended rise time, driving speed, amount of speed change and the like for starting the carriage cannot be satisfied.

However, even in such a recording device, no counter-measure is taken when miscounting of an encoder occurs at the reversal operation of the carriage, or the like.

SUMMARY OF THE INVENTION

It is an object of the present invention to solve the above-described problems.

It is another object of the present invention to provide a recording device which performs secure and highly-reliable carriage driving by securely performing closed-loop driving of a stepping motor.

It is another object of the present invention to provide a recording apparatus including a recording head; a carriage for carrying the recording head; a stepping motor for driving the carriage, the stepping motor including a rotor and a coil; a rotation position detector; a controller; a motor speed control circuit; and a current switching circuit. The position detector detects a rotation angle of the rotor of the stepping motor and generates a pulse signal at every interval of rotation of a predetermined angle of the rotor. The controller counts the pulse signals from the detector to create a count value, detects the position of the carriage in accordance with the count value, and outputs initializing signals and starting, stopping and speed control signals for controlling the carriage. The controller outputs the initializing signals in accordance with an exciting current supplied to the stepping motor. The speed control circuit controls the exciting current for the stepping motor in accordance with a time interval between the pulse signals from the detector by comparing the time interval with a reference time period corresponding to the speed control signal from the controller, generates a comparison result, and controls the exciting current for the stepping motor in accordance with the comparison result. The current switching circuit counts the pulse signals from the detector, switches the exciting current supplied to the coil of the stepping motor in accordance with the count value, and performs a closed-loop control of the motor. The current switching circuit performs stepping-motor driving of the stepping motor according to the initializing signals from the controller in addition to driving of the stepping motor using the closed-loop control and resets the count value by setting the rotor to a stable position. The switching circuit also starts a switching control of the exciting current according to the starting control signal from the controller, and stops the switching control of the exciting current according to the stopping control signal.

It is still another object of the present invention to provide a recording apparatus including a recording head; a carriage for carrying the recording head; a stepping motor for driving the carriage, the stepping motor including a rotor and a coil; a rotating position detector; a speed control circuit; a controller; and a current switching circuit. The detector detects a rotation angle of the rotor of the stepping motor and generates a pulse signal at every interval of rotation of a predetermined angle of the rotor. The speed control circuit generates a control output for controlling a speed of the stepping motor, the control output being generated in accordance with a time interval between the pulse signals from the detector. The controller outputs an initializing signal when the control output from the speed control circuit exceeds a predetermined level. The current switching circuit counts the pulse signals from the detector and generates a count value, and performs a switching control of an exciting current supplied to the coil of the stepping motor when the count value and a set value reach a predetermined relationship. The set value set in the current switching circuit is reset according to the initializing signal from the controller.

These and other objects of the present invention will become more apparent from the following detailed description of the preferred embodiments of the invention.

DETAILED DESCRIPTION OF THE PREFERRED EMBODIMENTS

The preferred embodiments of the present invention will now be explained with reference to the drawings.

Figure 1:
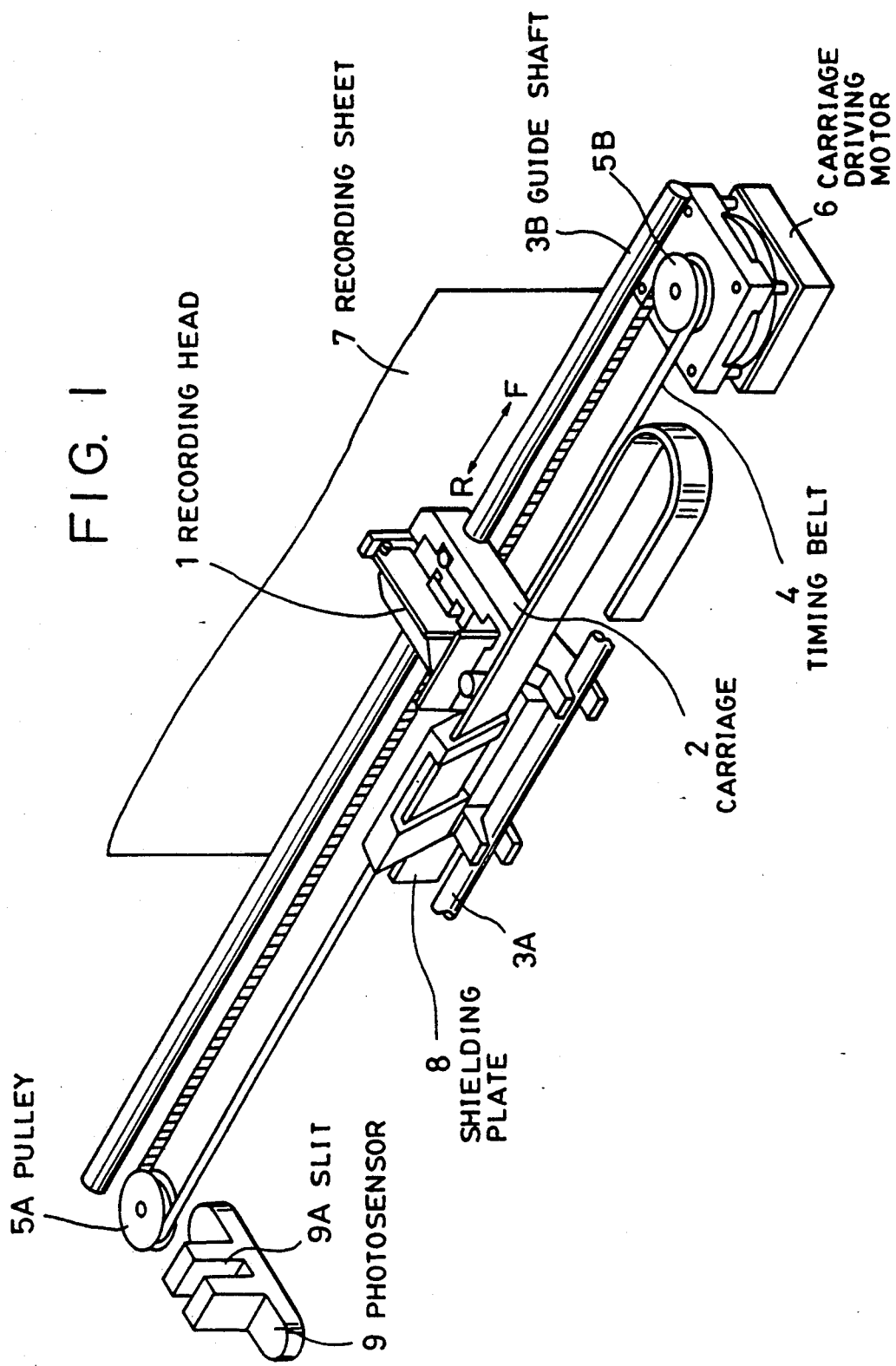
FIG. 1 is a perspective view of a carriage driving mechanism according to the present invention.

FIG. 1 shows a recording device according to the present invention. In FIG. 1, a recording head 1 is, for example, an ink-jet-type head. A carriage 2 mounts the recording head 1, and moves it along guide shafts 3A and 3B. A timing belt 4 is stretched between pulleys 5A and 5B. Both ends of the timing belt 4 are connected to the carriage 2. A carriage driving motor 6 drives the carriage 2 via the timing belt 4. A recording sheet 7 is held at a position facing the recording head 1 by a platen (not shown) or the like. A shielding plate 8 is mounted on the carriage 2. If the carriage 2 moves in the reverse direction R, that is, in the leftward direction, in FIG. 1, and reaches an initial position, the position is detected due to the superposition of the shielding plate 8 on a slit 9A of a photosensor 9, and an encoder (not shown) coaxially provided on the carriage driving motor 6 is initialized to be "0". As the carriage 2 moves from this initial position in the forward direction F, that is, the rightward direction, the position of the carriage 2 is successively detected by counting signals from the encoder, and the head is able to record on corresponding positions on the recording sheet 7. After the completion of a scan corresponding to recording for one line, the recording sheet 7 is advanced a distance equal to the amount of one line. As an example of the driving condition of the carriage driving motor 6 in such a recording operation, if the recording density is 360 dots/inch, the rotation speed of the carriage driving motor 6 corresponding to the recording speed is 400-1200 rpm.

Figure 2A:
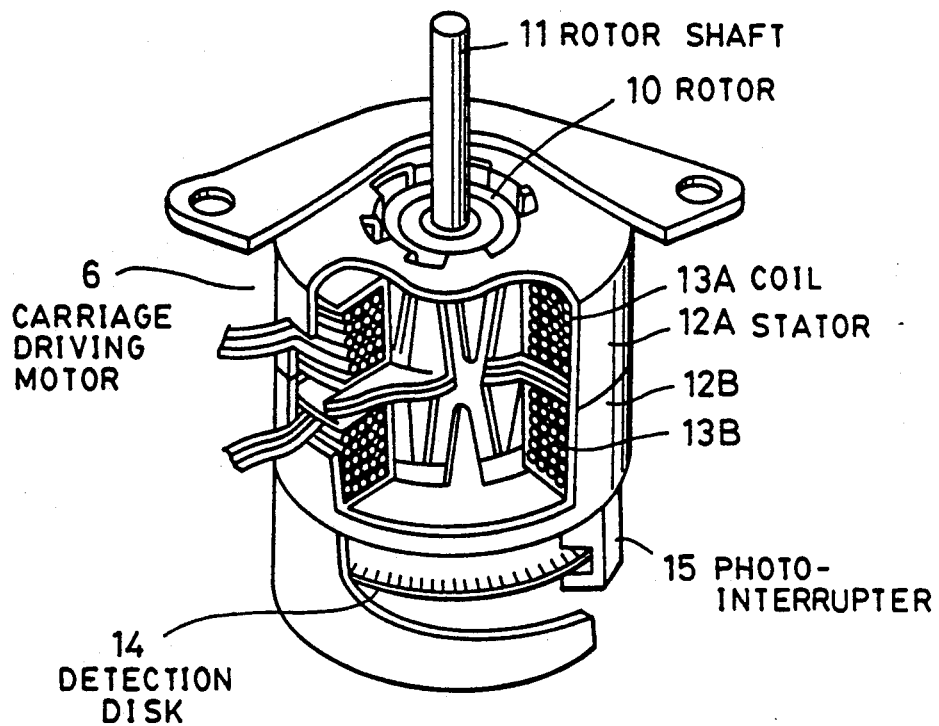
FIG. 2A illustrates the configuration of a carriage motor shown in FIG. 1.
Figure 2B:
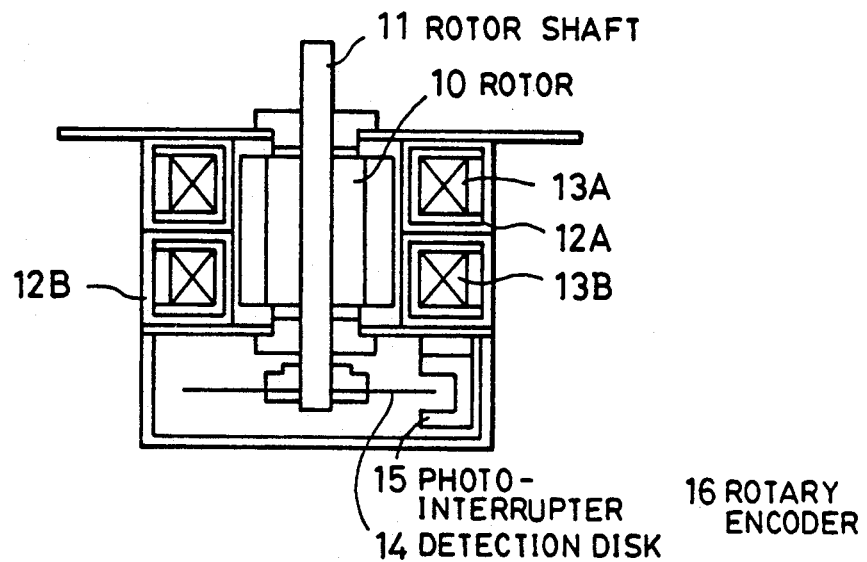
FIG. 2B is a cross-sectional view of the motor shown in FIG. 2A.

FIGS. 2A and 2B show the configuration of the above-described carriage driving motor 6. In FIGS. 2A and 2B, there are shown a rotor 10, a rotor shaft 11, stators 12A and 12B disposed around the rotor 10, and coils 13A and 13B. A detection disk 14 is coaxially provided on the rotor shaft 11, and a photo-interrupter 15 is mounted at the side of the stator. Thus, the rotation position of the motor 6 can be detected by measuring output pulses from a rotary encoder 16 comprising the detection disk 14 and the photo-interrupter 15.

Figure 3:
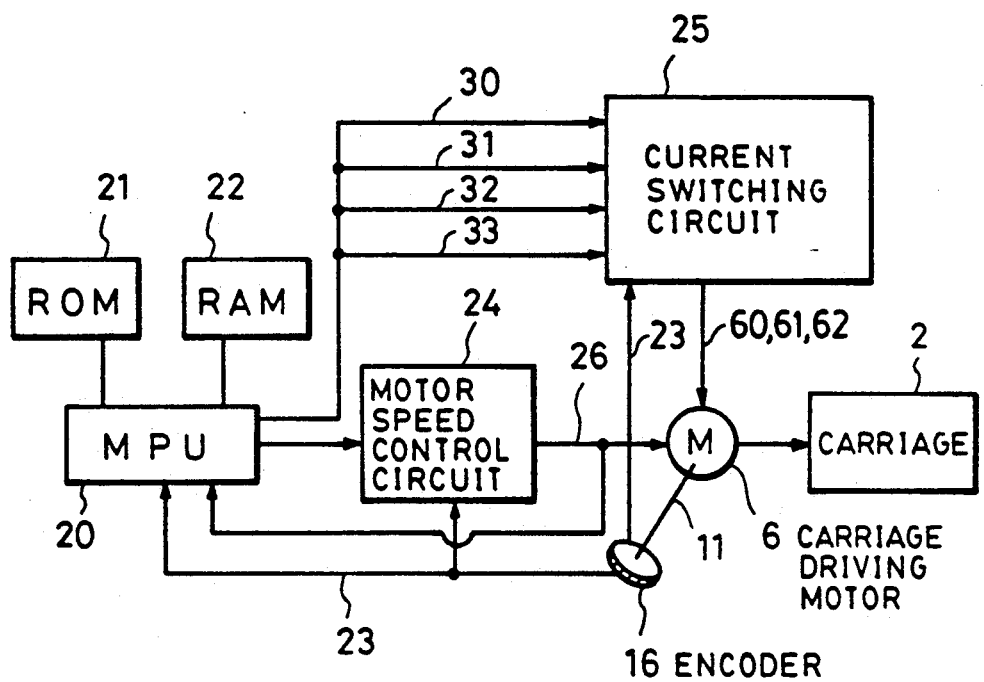
FIG. 3 is a block circuit diagram of a driving control system of the motor shown in FIG. 1 according to an embodiment of the present invention.

FIG. 3 shows a motor driving control system for performing closed-loop driving of the carriage driving motor 6. In FIG. 3, an MPU 20 controls the entire printer. In accordance with control programs stored in a ROM 21, the MPU 20 controls a driving source for other respective printer mechanisms (not shown) using a RAM 22 for processing recording data, and performs the above-described driving control of the carriage driving motor 6 for driving the carriage 2. For that purpose, the MPU 20 includes a counter constituted by hardware (not shown) or software, and detects the position of the carriage 2 by measuring the above-described out-put pulses 23 from the rotary encoder 16. The MPU 20 also controls the rotation speed of the carriage driving motor 6 by a program for controlling the motor speed, and performs the starting and stopping of the carriage driving motor 6 via a current switching circuit 25 for switching the exciting current of the coils 13A and 13B of the carriage driving motor 6. The speed control will be explained in detail later.

Figure 4:
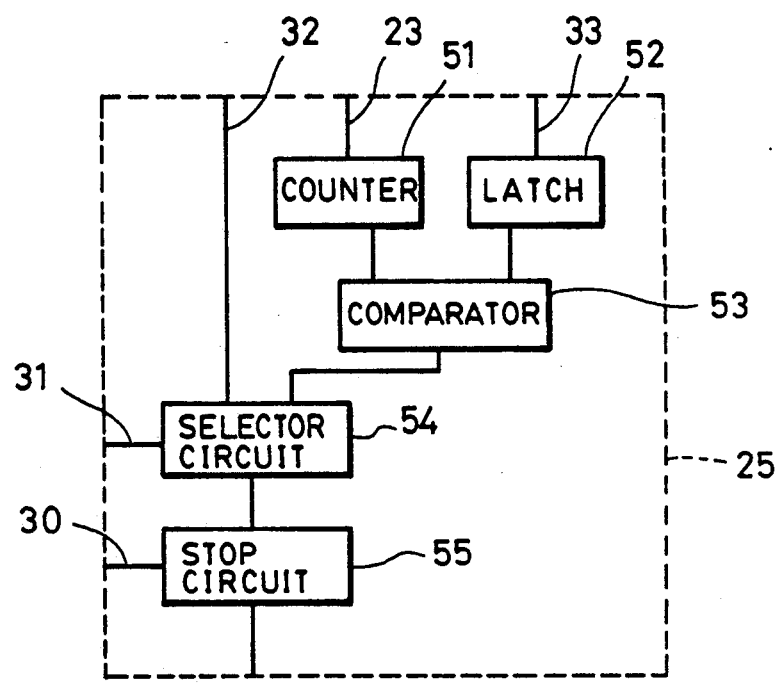
FIG. 4 is a detailed circuit diagram of a current switching circuit shown in FIG. 3.

The current switching circuit 25 starts the above-described switching operation of the exciting current by start/stop signals 30 input from the MPU 20, to start and stop the carriage driving motor 6. The current switching circuit 25 also performs a closed-loop control of the timing of switching the coil exciting current of the carriage driving motor 6 in accordance with the detection output of the encoder 16. For that purpose, as shown in FIG. 4, the current switching circuit 25 includes a counter 51 and a latch circuit 52. The counter 51 counts output pulses 23 from the encoder 16. A comparator circuit 53 switches the exciting current when the count value coincides with a predetermined value set in the latch circuit 52 by the MPU 20. An arbitrary value may be set in the latch circuit 52 for an arbitrary timing by a setting signal 33 of the MPU 20.

It is assumed that the current switching circuit 25 for the carriage driving motor 6 is of a single-phase-excitation-type. The carriage driving motor 6 is switched, for example, 48 times for every rotation of the rotor 10, and the number of output pulses from the encoder 16 is 288 pulses per rotation. The rotor 10 rotates by an equal angle every time a pulse is output. Hence, if a comparison value is set in the latch circuit 52 so that the switching of the exciting current is performed for every time 6 (288÷48) pulses are counted, the exciting current is always switched with a timing for rotation of an equal angle (in the state that the relative position between the magnetic poles of the rotor 10 and the magnetic poles of the stators 12A and 12B is maintained in a predetermined relationship).

Figure 5:
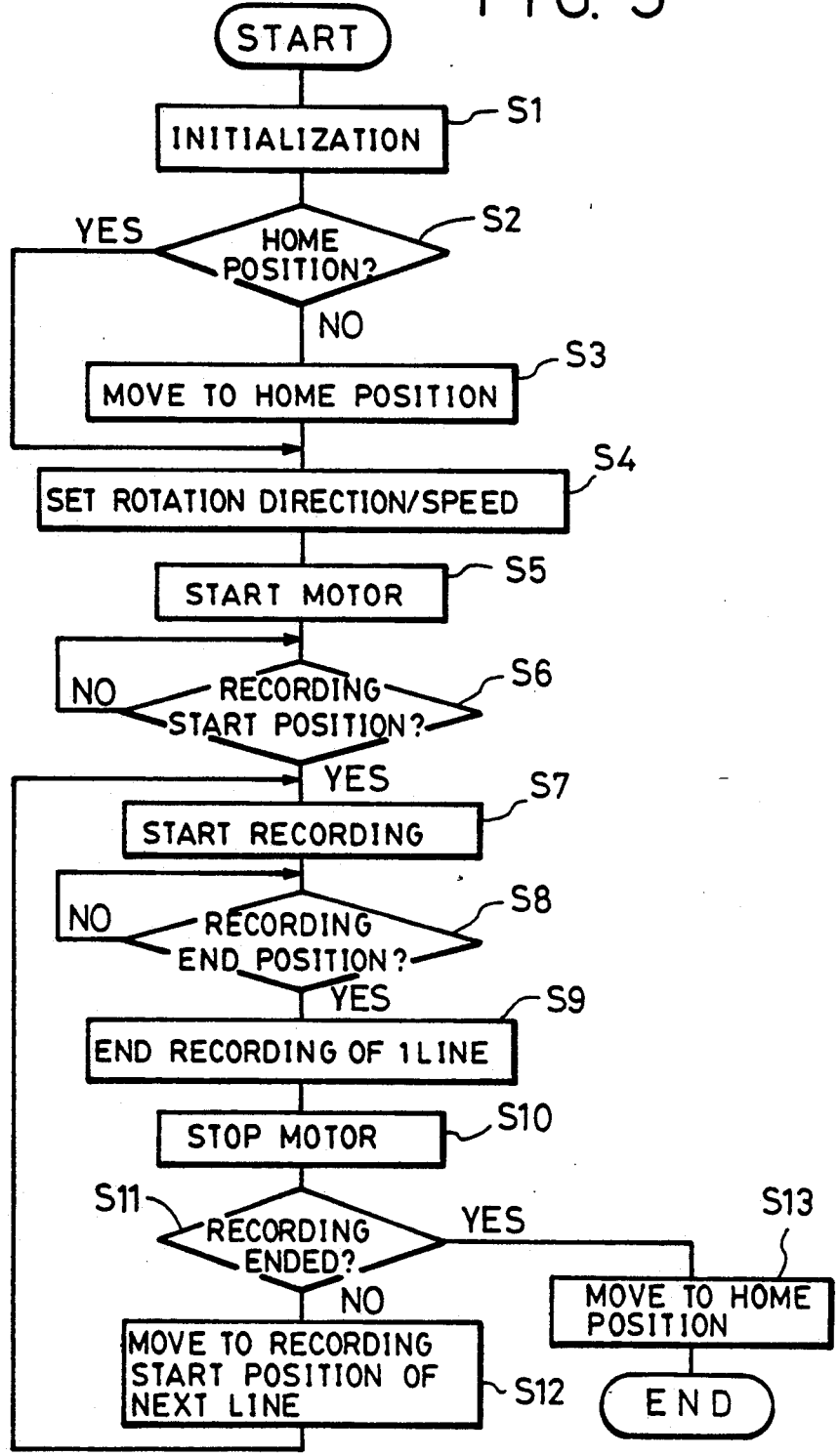
FIG. 5 is a flowchart for the FIG. 3 circuitry.

An explanation will now be provided of the procedure of control operations of the carriage driving motor 6 by the MPU 20 during recording, with reference to FIG. 5. An explanation of control operations of other mechanisms by the MPU 20 will be omitted. It is assumed that a control program corresponding to the procedure of such control operations is stored in the ROM 21. When a power supply of the printer is turned on, at step S1, initializing processing for obtaining the above-described correct correspondence between the position of the rotor 10 and the count value of the counter 51 of the current switching circuit 25 is performed.

Figure 6:
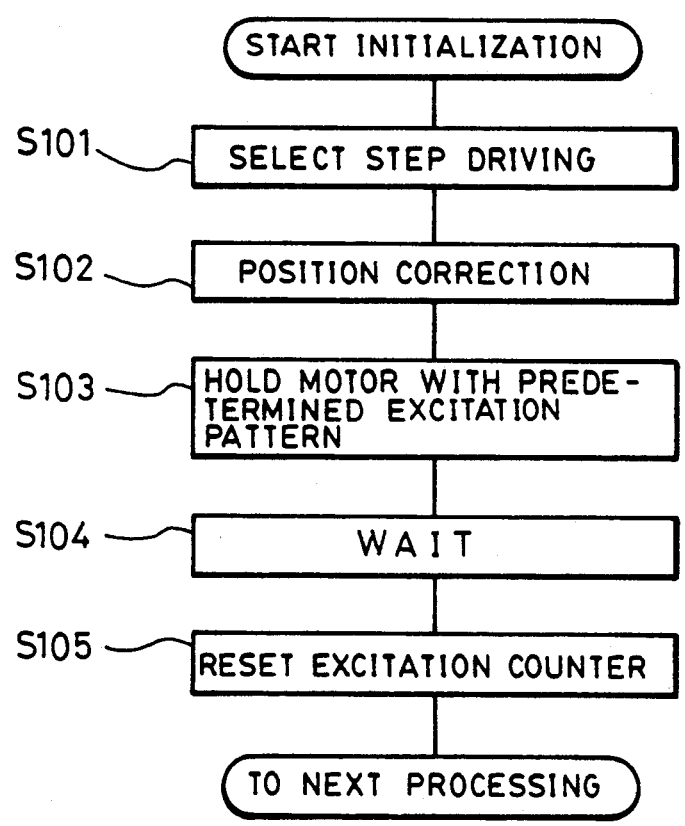
FIG. 6 is a flowchart for initializing processing of the FIG. 3 circuitry.

FIG. 6 shows the flow of the initializing processing. As described above, when current is supplied, it is uncertain where the carriage 2 is situated. Hence, the carriage 2 is moved within a range wherein the initializing processing can be securely executed. In the serial printer to which the present invention is applied, the stepping motor 6 is subjected to closed-loop driving in the same manner as for a multipole-type brushless motor, but of course functions as a stepping motor. Hence, in order to move the carriage 2, the MPU 20 may transmit a stepping motor driving pattern 32 to the current switching circuit 25 to drive the stepping motor 6. For that purpose, at step S101, the MPU 20 outputs a step driving selection signal 31 so that the selector circuit 54 of the current switching circuit. By thus utilizing the stepping motor operation, it becomes possible to move the carriage 2 to a predetermined position necessary for performing the initializing processing for driving the motor.

Next, the initializing processing of positioning the magnetic poles of the rotor 10 and the magnetic poles of the encoder 16 is performed. Although conditions for the positioning have not been described, it is desirable that the rotor 10 and the encoder 16 are situated at a proper relative position so as to smoothly and satisfactorily drive the motor 6. Accordingly, in the present embodiment, assuming that it is preferred to perform the switching operation of the exciting current when, for example, the center (a portion having the strongest magnetization) of each pole of the rotor 10 coincides with the center of the pole of either one of the stator 12A and 12B, that is, when the driving torque is 0, the above-described initializing processing is performed in the following manner with reference to FIG. 6. First, at step S101, the motor 6 is driven in the amount of one cycle or two cycles (one cycle corresponds to four steps in the case of single-phase excitation) with a driving pattern of single-phase excitation. This operation releases the motor 6 when the carriage 2 stops at a dead point of the motor 6. When the final step driving has ended at step S102, the excitation state is held for a certain time period at steps S103 and S104. The process then proceeds to step S105, where the value of the counter 51 controlling the switching timing of the excitation current is set to 0 to interrupt the excitation current. As described above, a waiting time is provided between the final step and the clearing operation of the counter 51 so that vibration of the rotor 10 disappears during that time period to allow correct positioning. The foregoing processing may be performed with two-phase excitation or single/two-phase excitation. In such cases, the initial value of the counter 51 may be set to a predetermined value. According to the above-described initializing processing, correspondence between the magnetic poles of the rotor 10 and the magnetic poles of the encoder 16 is provided, and the processing of generating the switching timing of the excitation current is also prepared. This correspondence relationship is maintained after the initializing processing unless the power supply of the printer is turned off.

After the above-described initializing processing, at step S2, the MPU 20 determines whether the carriage 2 is situated at a home position at the left end in FIG. 1 according to a signal from the photosensor 9. If the result of the determination is negative, at step S3, the carriage driving motor 6 is driven to move the carriage 2 to the home position. If the result of the determination is affirmative, the process proceeds to step S4. The detection of whether the carriage 2 is situated at the home position is performed according to a detection signal from the photosensor 9. Next, at step S4, the rotation speed and the direction of rotation of the motor 6 are determined in accordance with a recording mode indicated from a host system (not shown), and the amount of rotation of the carriage driving motor 6 is determined from the number of prints per line. At step S5, the carriage driving motor 6 is started by the drive of the current switching circuit 25. That is, the carriage 2 is started. At the same time as the start of the carriage driving motor 6, the MPU 20 starts to count output pulses from the encoder 16. Next, at step S6, the MPU 20 determines whether the carriage 2 has reached the position to start recording according to the count value of output pulses from the encoder 16. If the result of the determination is affirmative, at step S7, the recording head 4 is driven to start recording. At that time, the MPU 20 controls the rotation speed of the motor 6 via a motor speed control circuit 24 so that the moving speed of the carriage 2 is constant.

In the speed control of the present embodiment, the rotation speed of the carriage driving motor 6 is subjected to a closed-loop control in accordance with the detection output of the encoder 16. More specifically, the time period of the interval between the output pulses 23 from the encoder 16 is compared with a preset target time period, and a control output 26 for the carriage driving motor 6 is controlled so as to reduce a difference between the above-described two time periods in accordance with the result of the comparison. In general, the control output 26 comprises a PWM signal (pulse-width modulation signal), and can control the value of a current flowing through the motor coil. If the PWM signal is assumed to have a resolution of 8 bits (256 steps), its maximum value is 255. If the MPU 20 indicates a rotation speed of the carriage driving motor 6 for the motor speed control circuit 24 having the above-described function, the motor speed control circuit 24 selects a reference time period for comparison corresponding to the indicated speed, compares the reference time period with the time period of the interval between the pulses from the encoder 16, and outputs a value calculated from a difference between the two time periods to the motor. Such speed control is usually performed with an interval of a few seconds.

In the present embodiment, when executing printing while maintaining the speed of the carriage 2 constant, the MPU 20 continues to output a predetermined value corresponding to the driving mode to the speed control circuit 24, and reads the control output 26. If the moving speed of the carriage 2 is constant and the load of the motor 6 is constant, the PWM values of the speed control outputs are nearly constant without large variations. However, as described above, if the timing of the current switching is abnormal, the PWM output value is increased. Accordingly, by monitoring the PWM output value when performing the speed control, it is possible to check whether the switching of the exciting current for the motor 6 is normal. If the value of the PWM signal is increased, the MPU 20 first stops the printing operation, and memorizes the position of the carriage 2 and print data. Subsequently, the setting of the timing (initializing processing) of the switching of the exciting current for the motor 6 is performed. This processing is basically the same processing as the above-described initializing processing when the power supply is turned on. However, the position correction at step S102 is not performed because it is unnecessary. According to this processing, the timing of the switching of the exciting current for the motor 6 is normally performed. Hence, the printing operation is resumed.

If the printing device can perform printing of 130 digits, the speed control is performed several hundreds of times. In such a case, the above-described processing is properly performed by checking control outputs every time.

Next, at step S8, the MPU 20 determines whether the carriage 2 has reached the end position for recording one line from the count value of output pulses from the encoder 16. If the result of the determination is affirmative, at step S9, the recording operation of the recording head 4 is stopped to end recording for one line. At step S10, a stop signal 30 is output to the current switching circuit 25, whereby a stop circuit 55 of the current switching circuit 25 short-circuits both ends of the coil of the carriage motor 6 to stop the carriage driving motor 6.

Subsequently, at step S11, the CPU 20 determines whether the entire printing operation has ended according to the presence of remaining recording data. If the result of the determination is affirmative, the process proceeds to step S13, where the carriage 2 is moved to the home position by driving the carriage driving motor 6, and the processing is terminated. If the result of the determination is negative, since recording data for the next line are present, the process proceeds to step S12, where the carriage 2 is moved to the position to start recording of the next line by driving the carriage driving motor 6. The process then returns to step S7, where the same processing is repeated. When performing reciprocating recording, the above-described position to start recording of the next line is set to be the left-end position of the recording sheet on the next line. When moving the carriage 2 in the reverse direction (the direction R in FIG. 1) by rotating the carriage driving motor 6 in the reverse direction, the position of the carriage 2 is detected, of course, by substracting output pulses from the encoder 16.

In the above-described explanation of the present embodiment, a control output is checked every time the speed control is set at a constant speed. A case wherein local variations in load occur due to temporary increase in control outputs may be considered in the recording device. In consideration of such a case, an average value of control outputs while recording for one line is performed may be obtained, and the initializing processing may be performed while recording stops after the end of recording. In this case, it is possible to perform a more stable determination.

In the above-described embodiment, when the timing of the switching of the exciting current deviates, printing is stopped, and the initializing processing is resumed. However, the switching of the exciting current may be normalized without stopping the carriage 2.

Figure 7:
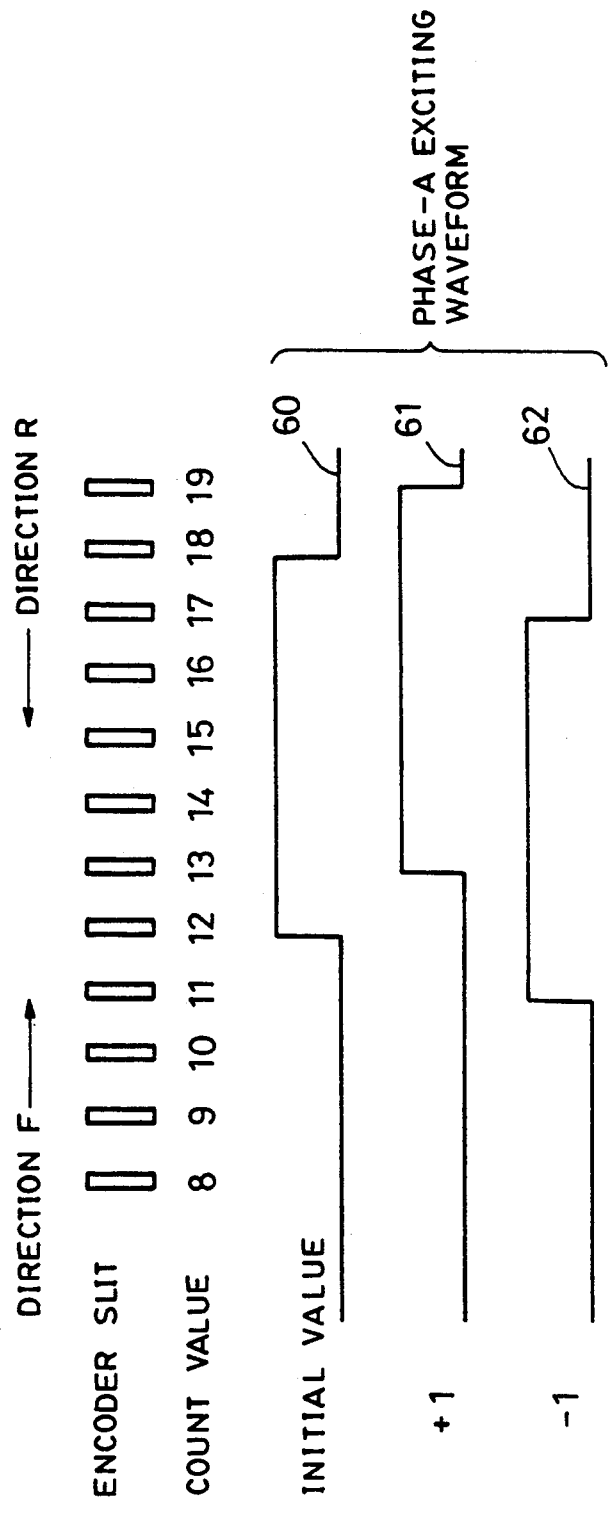
FIG. 7 illustrates how the exciting timing of the current switching circuit shown in FIG. 4 is changed.

In this case, the fact that the switching of the current becomes abnormal and the control output for the motor 6 increases indicates that the timing of the switching of the current tends to be delayed. Accordingly, in order to provide normal current switching, the MPU 20 performs processing to quicken the timing of switching the exciting current by changing the comparison value for the counter 51 set in the latch circuit 52. FIG. 7 illustrates exciting signals for the motor 6 when the timing of switching the exciting current is changed. As is apparent from FIG. 7, when the carriage 2 is moving in the direction F (the counter 51 of the current switching circuit 25 is incrementing the count value), if the comparison value is reduced by one, the switching timing is deviated for the amount of one count of the encoder signal to provide a switching signal 62. That is, the timing of switching the current is quickened to increase the amount of the current flowing through the coil. As a result, the control output for the motor 6 is decreased.

In the case of reverse rotation, the MPU 20 may increment the current switching value set in the latch circuit 52 by one from the initial value.

Thus, it is possible to securely and promptly change the timing of switching the current for the carriage driving motor 6.

ANOTHER EMBODIMENT

Figure 8:
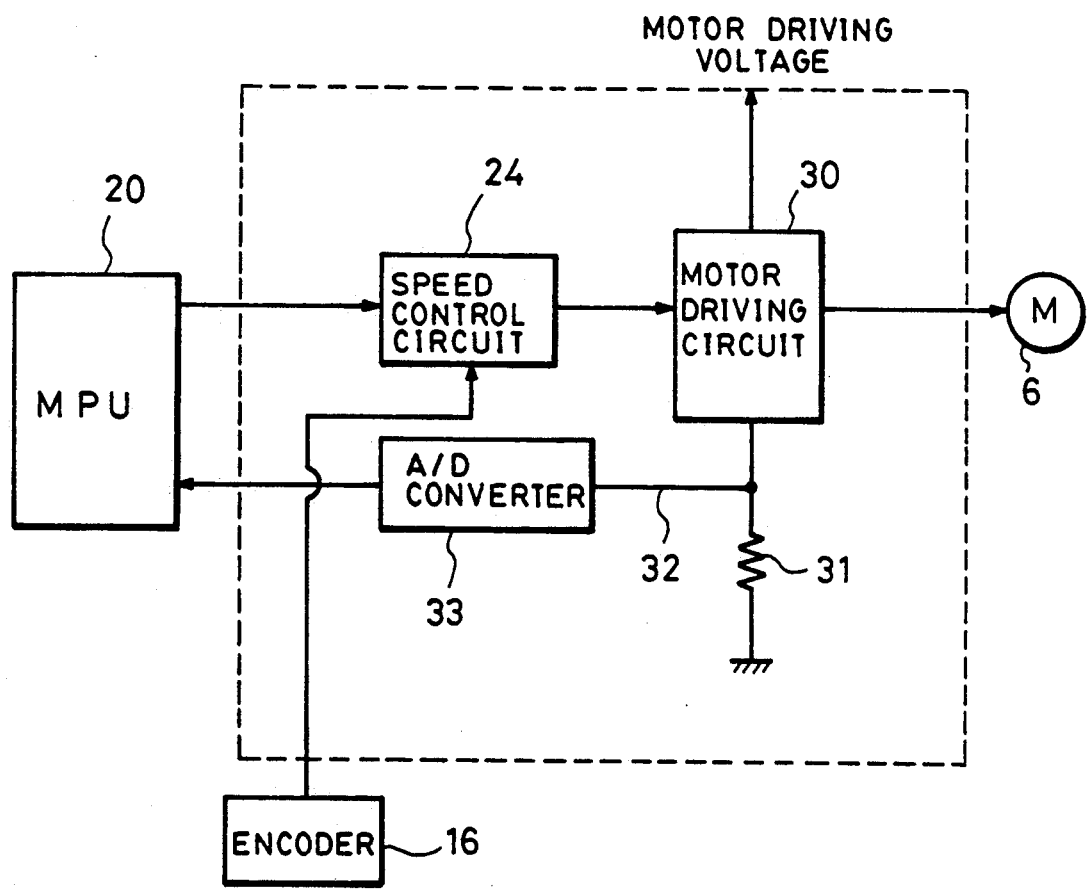
FIG. 8 is a block circuit diagram of a driving control system of the motor shown in FIG. 1 according to another embodiment of the present invention.

In the foregoing embodiment, abnormality of the timing of switching the exciting current is determined according to the PWM value of the speed control. In the present embodiment, the abnormality is determined by detecting the value of the current flowing through the motor. FIG. 8 is a block diagram of a motor driving control system according to the present embodiment. In the present embodiment, in order to detect the value of the current flowing through the motor, a detection resistor is inserted in series with the motor. If the switching of the current of the motor is normal, the value of the current is nearly constant. However, if the timing is deviated, the motor current is increased even if the motor is controlled at the same speed. Accordingly, by periodically checking the motor current by the MPU 20, abnormality in the switching of the current can be detected. Processing after the detection is the same as in the first embodiment.

As is apparent from the foregoing explanation, according to the present invention, a recording device for performing recording by reciprocating a carriage mounting a recording head by a stepping motor comprises rotation position detection means for detecting a rotation position of a rotor of the stepping motor, control means for performing closed-loop driving of a switching timing of an exciting current of the stepping motor according to a detection signal from the rotation position detection means, and a motor speed control circuit for controlling a rotation speed of the stepping motor according to the detection signal from the rotation position detection means. The device performs stationary confirmation whether the switching timing of the stepping motor is normally performed via the control means. Hence, it is possible to provide a recording device which can perform high-speed recording with low noise and which has high durability.

While the present invention has been described with respect to what is currently considered to be the preferred embodiments, it is to be understood that the invention is not limited to the disclosed embodiments. To the contrary, the invention is intended to cover various modifications and equivalent arrangements included within the spirit and scope of the pending claims. The scope of the following claims is to be accorded the broadest interpretation so as to encompass all such modifications and equivalent structures and functions.

What is claimed is:

1. A recording apparatus comprising:
   a recording head;
   a carriage for carrying said recording head;
   a stepping motor for driving said carriage, said stepping motor including a rotor and a coil;
   detection means for generating pulse signals corresponding to rotation of said rotor of said stepping motor;
   speed control means for generating a control output for controlling a speed of said stepping motor, the control output being generated in correspondence to a time interval between the pulse signals from said detection means;
   control means for outputting an initializing signal when the control output from said speed control means exceeds a predetermined level; and
   current switching means for counting the pulse signals from said detection means and switching an exciting current supplied to said coil of said stepping motor in accordance with the count value, wherein said current switching means stops the switching control of the exciting current in accordance with initializing signals from said control means, keeps the exciting state of the current and resets the count value by setting said rotor to a stable position, then restarts the switching control of the exciting current.

2. A recording apparatus according to claim 1, wherein said recording head comprises an ink-jet-type recording head.

3. A recording apparatus comprising:
a recording head;
a carriage for carrying said recording head;
a stepping motor for driving said carriage, said stepping motor including a rotor and a coil;
detection means for detecting a rotation angle of said rotor of said stepping motor, said detection means generating a pulse signal at every interval of rotation of a predetermined angle of said rotor;
speed control means for generating a control output for controlling a speed of said stepping motor, the control output being generated in accordance with a time interval between the pulse signals from said detection means;
control means for outputting an initializing signal when the control output from said speed control means exceeds a predetermined level; and
current switching means for counting the pulse signals from said detection means and generating a count value, and performing a switching control of an exciting current supplied to said coil of said stepping motor when the count value and a set value reach a predetermined relationship, said current switching means resetting the set value set in said current switching means according to the initializing signal from said control means.

4. A recording apparatus according to claim 3, wherein said current switching means comprises a counter for counting the pulse signals.

5. A recording apparatus according to claim 4, wherein said current switching means comprises setting means for setting the set value, and comparison means for comparing the set value of the setting means with the count value of said counter.

6. A recording apparatus according to claim 5, wherein said control means controls a start of said current switching means and said speed control means.

7. A recording apparatus according to claim 3, wherein said detection means comprises an encoder, said encoder generating a pulse signal at every interval of rotation of a predetermined angle of said rotor of said stepping motor.

8. A recording apparatus according to claim 3, wherein said recording head comprises an ink-jet-type recording head.

* * * * *

UNITED STATES PATENT AND TRADEMARK OFFICE
CERTIFICATE OF CORRECTION

PATENT NO. : 5,264,769
DATED : November 23, 1993
INVENTOR(S) : Noriaki ITOH

It is certified that error appears in the above-indentified patent and that said Letters Patent is hereby corrected as shown below:

TITLE PAGE

<u>AT [56] REFERENCES CITED - U.S. PATENT DOCUMENTS</u>:

"4,963,808  5/1990  Torisawa, et al." should read
--4,963,808 10/1990  Torisawa, et al.--.

<u>COLUMN 7</u>:

Line 1, "circuit." should read --circuit 25 outputs the signal 32.--.

Signed and Sealed this

Twenty-third Day of August, 1994

Attest:

BRUCE LEHMAN

*Attesting Officer*    *Commissioner of Patents and Trademarks*